(12) United States Patent
Yoshida

(10) Patent No.: US 8,402,788 B2
(45) Date of Patent: Mar. 26, 2013

(54) METHOD FOR MANUFACTURING OPTICAL FIBER BASE MATERIAL

(75) Inventor: Makoto Yoshida, Ibaraki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 309 days.

(21) Appl. No.: 12/715,334

(22) Filed: Mar. 1, 2010

(65) Prior Publication Data

US 2010/0223959 A1 Sep. 9, 2010

(30) Foreign Application Priority Data

Mar. 3, 2009 (JP) .................................. 2009-048962

(51) Int. Cl.
*C03B 37/018* (2006.01)
(52) U.S. Cl. ............................... 65/377; 65/421; 65/413
(58) Field of Classification Search ............... 65/421, 65/413, 377
See application file for complete search history.

(56) References Cited

U.S. PATENT DOCUMENTS

| 4,810,189 A | 3/1989 | Mikami et al. |
| 2006/0137404 A1 | 6/2006 | Nunome et al. |

FOREIGN PATENT DOCUMENTS

| JP | 03-009047 B2 | 2/1991 |
| JP | 10-101343 A | 4/1998 |
| JP | 2003-226544 A | 8/2003 |
| JP | 2006-182624 A | 7/2006 |

*Primary Examiner* — John Hoffmann
(74) *Attorney, Agent, or Firm* — Chen Yoshimura LLP

(57) ABSTRACT

A method for manufacturing an optical fiber base material includes producing glass fine particles through a hydrolysis of a glass material gas in a flame created by an oxidizing gas and a combustible gas. The method uses a burner including: a central gas discharge port that ejects a gas containing an oxidizing gas; a plurality of small-diameter gas discharge ports that are arranged in a concentric circle with the central gas discharge port so as to externally surround the central gas discharge port, where the plurality of small-diameter gas discharge ports eject a gas containing an oxidizing gas; a combustible gas discharge port that is concentrically arranged with the central gas discharge port so as to externally surround the central gas discharge port, where the combustible gas discharge port has the plurality of small-diameter gas discharge port arranged therein and the combustible gas discharge port ejects a combustible gas; and an oxidizing gas discharge port that is concentrically arranged with the central gas discharge port so as to externally surround the combustible gas discharge port, the oxidizing gas discharge port ejecting an oxidizing gas. Here, a relation of $V_1 > V_2 > V_3 > V_4$ is satisfied where $V_1$ denotes a gas flow speed at the central gas discharge port, $V_2$ denotes a gas flow speed at the plurality of small-diameter gas discharge ports, $V_3$ denotes a gas flow speed at the combustible gas discharge port, and $V_4$ denotes a gas flow speed at the oxidizing gas discharge port.

3 Claims, 5 Drawing Sheets

METHOD FOR MANUFACTURING OPTICAL FIBER BASE MATERIAL

CROSS REFERENCE TO RELATED APPLICATION

The present application claims priority from a Japanese Patent Application No. 2009-48962 filed on Mar. 3, 2009, thecdcc contents of which are incorporated herein by reference.

BACKGROUND

1. Technical Field

The present invention relates to a method for manufacturing an optical fiber base material.

2. Description of the Related Art

A method for manufacturing an optical fiber base material includes producing glass fine particles through a hydrolysis of a glass material gas in a flame and depositing the produced glass fine particles onto a rotating starting member. For example, Outside Vapor Deposition (OVD) method attaches and deposits glass fine particles generated in a flame of a burner onto a starting member while the starting member is being rotated and reciprocated relative to the burner, to obtain a soot (or a deposit of glass fine particles), and then dehydrates and sinters the soot in an electric furnace.

Examined Japanese Patent Publication No. 03-009047 proposes a multi-nozzle burner that is configured such that small-diameter gas discharge ports ejecting an oxidizing gas are disposed within a combustible gas discharge port so as to surround a centrally arranged material gas discharge port. Japanese Patent Application Publications Nos. 10-101343 and 2003-226544 disclose a technique to properly adjust the focus distances of the small-diameter gas discharge ports ejecting an oxidizing gas to boost the blending of the ejected gases. Japanese Patent Application Publication No. 2006-182624 discloses that the flow rate ratio between the oxidizing gas supplied through the small-diameter gas discharge ports and the combustible gas and the flow speed ratio between the oxidizing gas supplied through the small-diameter gas discharge ports and the glass material gas may be adjusted in order to optimize the gas discharge conditions.

To fabricate a deposit of glass fine particles, a concentric multi-tube burner is used. When the concentric multi-tube burner does not sufficiently blend together a glass material gas, a combustible gas, and an oxidizing gas, however, the yield of the glass fine particles decreases. In this case, it is difficult to fabricate soot within a short period of time. On the other hand, if the blending of the glass material gas, the combustible gas, and the oxidizing gas is positively boosted, the glass fine particle production efficiency does increase but the instability of the flame increases. This lowers the ratio of the glass fine particles deposited onto the target surface. Accordingly, the improvement of the glass fine particle production efficiency is not fully turned into the increase in the deposition speed.

Furthermore, as the base materials increase in size, the flow rates of the gases supplied to the burner similarly increase. The increase in gas flow rate requires an increase in the distance between the burner and the deposition target surface for the purpose of protecting the burner against the radiation heat and preventing the glass fine particles from attaching onto the end of the burner. This requirement makes the flow of the flame generated by the burner unstable and makes it difficult to improve the deposition efficiency.

SUMMARY

Therefore, it is an object of an aspect of the innovations herein to provide a method for manufacturing an optical fiber base material, which is capable of overcoming the above drawbacks accompanying the related art. The above and other objects can be achieved by combinations described in the independent claims. The dependent claims define further advantageous and exemplary combinations of the innovations herein.

According to the first aspect related to the innovations herein, one exemplary method for manufacturing an optical fiber base material includes producing glass fine particles through a hydrolysis of a glass material gas in a flame created by an oxidizing gas and a combustible gas. The method uses a burner including: a central gas discharge port that ejects a gas containing an oxidizing gas; a plurality of small-diameter gas discharge ports that are arranged in a concentric circle with the central gas discharge port so as to externally surround the central gas discharge port, where the plurality of small-diameter gas discharge ports eject a gas containing an oxidizing gas; a combustible gas discharge port that is concentrically arranged with the central gas discharge port so as to externally surround the central gas discharge port, where the combustible gas discharge port has the plurality of small-diameter gas discharge port arranged therein and the combustible gas discharge port ejects a combustible gas; and an oxidizing gas discharge port that is concentrically arranged with the central gas discharge port so as to externally surround the combustible gas discharge port, the oxidizing gas discharge port ejecting an oxidizing gas. Here, a relation of $V_1 > V_2 > V_3 > V_4$ is satisfied where $V_1$ denotes a gas flow speed at the central gas discharge port, $V_2$ denotes a gas flow speed at the plurality of small-diameter gas discharge ports, $V_3$ denotes a gas flow speed at the combustible gas discharge port, and $V_4$ denotes a gas flow speed at the oxidizing gas discharge port.

According to the second aspect related to the innovations herein, one exemplary method for manufacturing an optical fiber base material includes producing glass fine particles through a hydrolysis of a glass material gas in a flame created by an oxidizing gas and a combustible gas. The method uses a burner including: a central gas discharge port that ejects a gas containing an oxidizing gas; a plurality of small-diameter gas discharge ports that are arranged in a concentric circle with the central gas discharge port so as to externally surround the central gas discharge port, where the plurality of small-diameter gas discharge ports eject a gas containing an oxidizing gas; a combustible gas discharge port that is concentrically arranged with the central gas discharge port so as to externally surround the central gas discharge port, where the combustible gas discharge port has the plurality of small-diameter gas discharge port arranged therein and the combustible gas discharge port ejects a combustible gas; and an oxidizing gas discharge port that is concentrically arranged with the central gas discharge port so as to externally surround the combustible gas discharge port, the oxidizing gas discharge port ejecting an oxidizing gas. Here, relations of $H/(O_1+O_2+O_3) > 2$ and $O_1 < O_2 < O_3$ are both satisfied where $O_1$ denotes a gas flow rate at the central gas discharge port, $O_2$ denotes a gas flow rate at the plurality of small-diameter gas discharge ports, $O_3$ denotes a gas flow rate at the oxidizing gas discharge port, and H denotes a gas flow rate at the combustible gas discharge port.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

DESCRIPTION OF EXEMPLARY EMBODIMENTS

Some aspects of the invention will now be described based on the embodiments, which do not intend to limit the scope of the present invention, but exemplify the invention. All of the features and the combinations thereof described in the embodiment are not necessarily essential to the invention.

Figure 1:
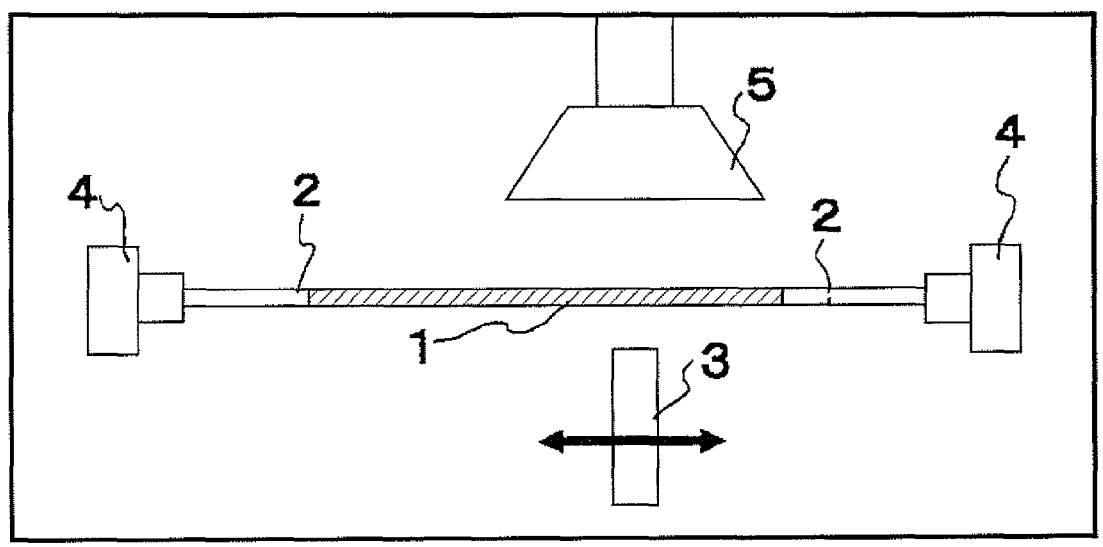
FIG. 1 is a schematic view illustrating an apparatus for manufacturing an optical fiber base material.

FIG. 1 is a schematic view illustrating an apparatus for manufacturing an optical fiber base material by means of the OVD method. The apparatus includes a burner 3 positioned within a reaction chamber, an ingot chuck mechanism 4, and an exhaust hood 5.

The ingot chuck mechanism 4 holds dummy rods 2 welded to the respective ends of a core portion 1 of an optical fiber base material and horizontally holds the core portion 1 and dummy rods 2 within the reaction chamber. Furthermore, the ingot chuck mechanism 4 rotates the core portion 1 and dummy rods 2 around the rotation axis extending in the longitudinal direction of the dummy rods 2.

The burner 3 is positioned below the core portion 1, which is held by the ingot chuck mechanism 4. The burner 3 sprays a flame onto the side surface of the core portion 1 while being reciprocated along the core portion 1 as indicated by the arrow in FIG. 1 by a burner guide mechanism (not shown).

Here, the burner 3 is reciprocated in order that a starting member including the core portion 1 and the dummy rods 2 and the burner 3 reciprocate relative to each other. Therefore, in place of the burner 3, it may be the starting member which is reciprocated in its longitudinal direction.

The exhaust hood 5 is positioned above the core portion 1. The exhaust hood 5 removes from the reaction chamber the gases and the glass fine particles that are output from the burner 3 but are not deposited onto the core portion 1.

Figure 2:
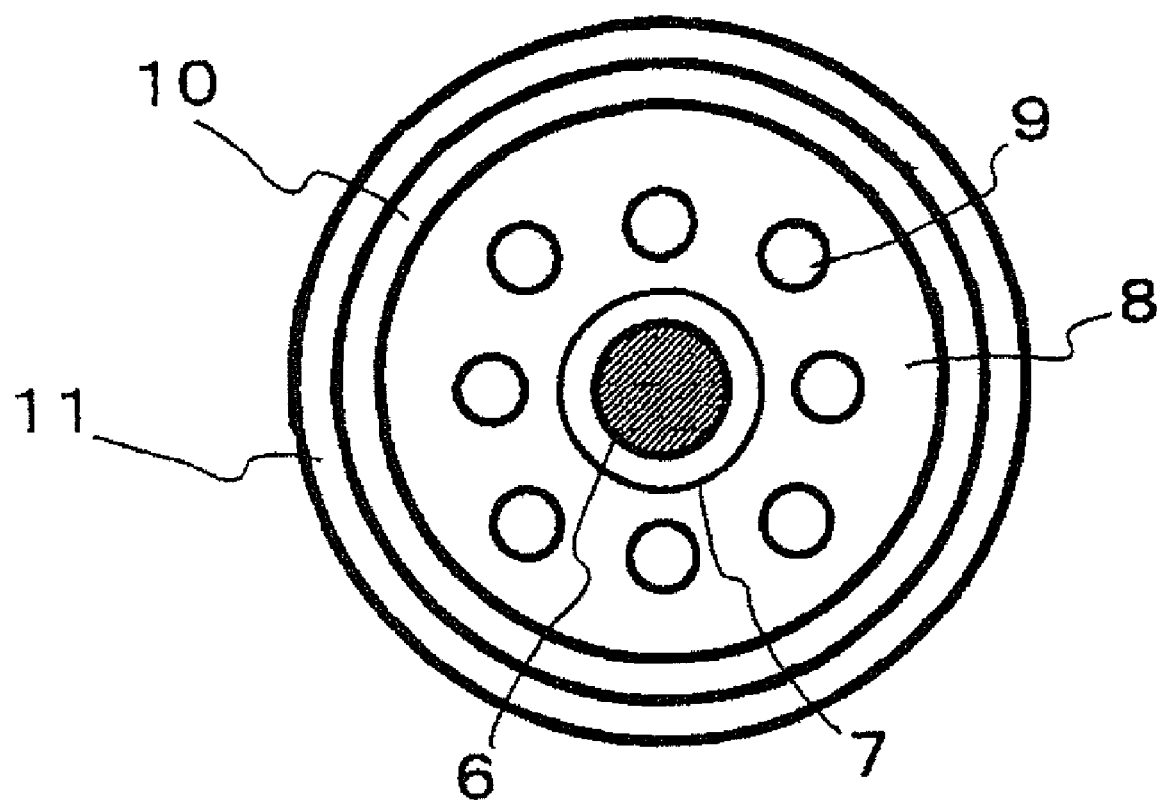
FIG. 2 is a schematic view illustrating the horizontal section of the end of a burner.

FIG. 2 is a schematic view illustrating the horizontal section of the end of the burner 3. The burner 3 is a concentric multi-tube burner, and includes a central gas discharge port 6, seal gas discharge ports 7 and 10, a combustible gas discharge port 8, and small-diameter gas discharge ports 9.

The central gas discharge port 6 is positioned at the center of the burner 3. The seal gas discharge port 7 is positioned so as to externally surround the central gas discharge port 6 concentrically with the central gas discharge port 6.

The combustible gas discharge port 8 is positioned so as to externally surround the seal gas discharge port 7 concentrically with the central gas discharge port 6 and the seal gas discharge port 7. The combustible gas discharge port 8 includes therein eight small-diameter gas discharge ports 9.

The eight small-diameter gas discharge ports 9 are arranged in single circle concentrically with the central gas discharge port 6. The eight small-diameter gas discharge ports 9 in the same circle have the same focus distance. The combustible gas discharge port 8 is further externally surrounded by the seal gas discharge port 10 and the oxidizing gas discharge port 11 in the stated order. The seal gas discharge port 10 and the oxidizing gas discharge port 11 are concentrically arranged with the combustible gas discharge port 8.

In the burner 3 having the above-described configuration, the central gas discharge port 6 ejects a glass material gas, which is a raw material of the optical fiber glass base material, together with an oxidizing gas. The combustible gas discharge port 8 ejects a combustible gas, and the seal gas discharge ports 7 and 10 eject a seal gas. The small-diameter gas discharge ports 9 and the oxidizing gas discharge port 11 eject an oxidizing gas.

In the above-described burner 3, the combustible gas from the combustible gas discharge port 8 is supplied from inside and outside with the oxidizing gas from the small-diameter gas discharge ports 9 and the oxidizing gas from the oxidizing gas discharge port 11. With such a configuration, the combustible gas and the oxidizing gas are not wasted and sufficiently mix together in the burner 3. Furthermore, the burner 3 can prevent the combustible gas from spreading outwards and from flowing unstably.

Here, attention is focused on the flow speed distribution among the various discharge ports in the burner 3. Specifically speaking, the gas flow speeds at the respective discharge ports are controlled so as to satisfy the following Expression 1.

$$V_1 > V_2 > V_3 > V_4 \quad \text{[Expression 1]}$$

Here, $V_1$ denotes the gas flow speed at the central gas discharge port 6, which discharges the glass material gas together with the oxidizing gas, $V_2$ denotes the gas flow speed at the small-diameter gas discharge ports 9, which discharge the oxidizing gas, $V_3$ denotes the gas flow speed at the combustible gas discharge port 8, which discharges the combustible gas, and $V_4$ denotes the gas flow speed at the oxidizing gas discharge port 11, which discharges the oxidizing gas. Such a flow speed control boosts the blending of the gases and can stabilize the flow of the flame created by the burner 3.

Even if the above flow speed condition is satisfied, an excessively high gas flow rate at the central gas discharge port 6 may inhibit the reaction of the glass material gas and thus lower the deposition speed of the glass fine particles onto the starting member. Also, if an excessively large amount of oxidizing gas is supplied to the small-diameter gas discharge ports 9, the gas flow may cool the deposition target surface of the starting member. Therefore, the deposition ratio of the glass fine particles onto the starting member decreases. Furthermore, if the combustible gas discharge port 8 is supplied from outside with an excessively small amount of oxidizing gas, the combustible gas cannot be prevented from spreading outwards and the flow of the flame becomes less stable, which may inhibit the deposition of the glass fine particles onto the starting member.

Here, attention is focused on the flow rate distribution among the various discharge ports. Specifically speaking, the gas flow rates of the respective gas discharge ports are controlled so as to satisfy the conditions represented by the following Expressions 2 and 3.

$$H/(O_1+O_2+O_3) > 2 \quad \text{[Expression 2]}$$

$$O_1 < O_2 < O_3 \quad \text{[Expression 3]}$$

Here, $O_1$ denotes the flow rate of the gas supplied through the central gas discharge port 6, $O_2$ denotes the flow rate of the oxidizing gas supplied to the small-diameter gas discharge ports 9, $O_3$ denotes the flow rate of the oxidizing gas supplied to the oxidizing gas discharge port 11, and H denotes the flow rate of the combustible gas supplied to the combustible gas discharge port 8.

Controlling the gas flow rate distribution in the above fashion enables the oxidizing gas and the combustible gas to be blended with the flow of the glass material gas and the oxidizing gas at the center in a stable and concentrated manner. Specifically speaking, since the flow speed of the oxidizing gas ejected from the small-diameter gas discharge ports 9 is set higher than the flow speed of the combustible gas, the low-speed combustible gas is drawn into the high-speed oxidizing gas during the blending of the combustible gas and the oxidizing gas. In addition, the flow of the high-speed oxidizing gas serves as the center of the flow of the low-speed combustible gas, which forms a stable flow of a gas mixture in which the combustible gas stably flows along the flow of the oxidizing gas. Consequently, the above-described flow rate distribution control can boost the blending of the combustible gas and the oxidizing gas with it being possible to stabilize the flow of the flame.

Furthermore, the flow speed of the gas mixture containing the glass material gas and the oxidizing gas is set higher than the flow speed of the surrounding gas mixture containing the combustible gas and the oxidizing gas. In this manner, the gas mixture containing the combustible gas and the oxidizing gas is drawn into and blended with the gas mixture of the glass material gas and the oxidizing gas. Consequently, the blending of the combustible gas and the oxidizing gas into the glass material gas is boosted, which in turn improves the glass fine particle production efficiency. Also, the flow of the gas mixture containing the glass material gas and the oxidizing gas serves as the center of the flow of the gas mixture containing the combustible gas and the oxidizing gas. This further improves the stability of the flow of the flame.

In addition, the flow speed of the oxidizing gas ejected from the oxidizing gas discharge port 11 is set lower than the flow speed of the combustible gas. Such a control enables the flux of the combustible gas to be concentrated with it being possible to prevent the combustible gas from spreading into the surrounding intra-chamber atmosphere. As a result, the flow of the flame is stabilized.

Controlling the flow speeds and rates of the combustible gas flow and the three proximate different oxidizing gas flows in the above-described manner can stabilize the flow of the flame with it being possible to boost the blending of the gases. Thus, the present invention can improve both the yield and deposition efficiency of the glass fine particles.

<First Embodiment>

The apparatus illustrated in FIG. 1 was used to manufacture optical fiber base materials based on the OVD method. The starting member was provided by welding the pair of dummy rods 2 with an outer diameter of 50 mm to the respective ends of the core portion 1 (core rod) with an outer diameter of 50 mm and a length of 1,000 mm.

The burner 3 has the structure shown in FIG. 2. The focus distances of the small-diameter gas discharge ports 9 were uniformly set at 150 mm. Table 1 shows the gases supplied to the central gas discharge port 6 (FIRST TUBE), the seal gas discharge ports 7 and 10 (SECOND TUBE AND FOURTH TUBE), the combustible gas discharge port 8 (THIRD TUBE) and the small-diameter gas discharge ports 9.

TABLE 1

| FIRST TUBE | $SiCl_4 + O_2$ |
|---|---|
| SECOND TUBE | SEAL GAS |
| THIRD TUBE | $H_2$ |
| FOURTH TUBE | SEAL GAS |
| FIFTH TUBE | $O_2$ |
| SMALL-DIAMETER GAS DISCHARGE PORT | $O_2$ |

Under the above conditions, the burner 3 generated a flame and sprays the flame onto the starting member. In this case, 50 kg of the glass fine particles, which were produced by the hydrolysis in the flame, were deposited onto the starting member, to form an optical fiber base material. In addition, while the flow rates of the gases supplied to the burner 3 were kept at the same level, the flow speeds at the respective discharge ports were varied in first, second, third and fourth comparison examples. Table 2 shows the flow speeds of the gases in a first embodiment and the first to fourth comparison examples.

TABLE 2

|  | $V_1$ m/s | $V_2$ m/s | $V_3$ m/s | $V_4$ m/s | DEPOSITION EFFICIENCY % |
|---|---|---|---|---|---|
| Embodiment 1 | 29.5 | 25.9 | 12.1 | 2.1 | 68.0 |
| Comparison 1 | 22.6 | 25.9 | 12.1 | 2.1 | 64.6 |
| Comparison 2 | 29.5 | 9.3 | 12.1 | 2.1 | 63.8 |
| Comparison 3 | 29.5 | 25.9 | 12.1 | 14.0 | 66.0 |
| Comparison 4 | 10.0 | 12.1 | 13.4 | 14.0 | 63.0 |

In Table 2, $V_1$ denotes the gas flow speed at the central gas discharge port 6 (FIRST TUBE), $V_2$ denotes the gas flow speed at the small-diameter gas discharge ports 9, $V_3$ denotes the gas flow speed at the combustible gas discharge port 8 (THIRD TUBE), and $V_4$ denotes the gas flow speed at the oxidizing gas discharge port 11 (FIFTH TUBE).

As seen from Table 2, a deposition efficiency of 68.0% was achieved in the first embodiment, where the gas flow speeds of the respective gas discharge ports were controlled so as to satisfy the condition of $V_1 > V_2 > V_3 > V_4$. During the optical fiber base material manufacturing process in the first embodiment, the gases were well blended together while the flame remained concentrated, which stabilized the flow of the flame.

In the first comparison example, the flow speed $V_1$ was decreased by increasing the inner diameter of the central gas discharge port 6 (FIRST TUBE). In this case, the flame generated by the burner 3 spread, which made the surrounding flow of the oxyhydrogen flame unstable. The glass fine particle deposition efficiency also dropped to 64.6%.

In the second comparison example, the flow speed $V_2$ was decreased by increasing the inner diameter of the small-diameter gas discharge ports 9. In this case, the hydrogen flame became less concentrated, and the glass fine particle deposition efficiency dropped to 63.8%.

In the third comparison example, the flow speed $V_4$ was increased by reducing the inner diameter of oxidizing gas discharge port 11 (FIFTH TUBE). In this case, the flow of the hydrogen flame became unstable because it was drawn into the flow of the oxidizing gas and spread outwards. Consequently, the deposition efficiency dropped to 66.0%.

In the fourth comparison example, the flow speeds of the respective discharge ports were set so as to satisfy the relation represented by the following Expression 4.

$$V_1 < V_2 < V_3 < V_4 \quad \text{[Expression 4]}$$

In this case, the flow of the flame became significantly less concentrated as a whole, and the deposition efficiency dropped to as low as 43.0%.

<Second Embodiment>

The burner 3 having the same configuration as in the first embodiment was used to deposit 50 kg of glass fine particles onto the starting member having the same configuration as in the first embodiment. In a second embodiment, however, the flow rates of the gases supplied to the respective discharge ports were varied to alter the flow speed ratio among the ports.

Figure 3:
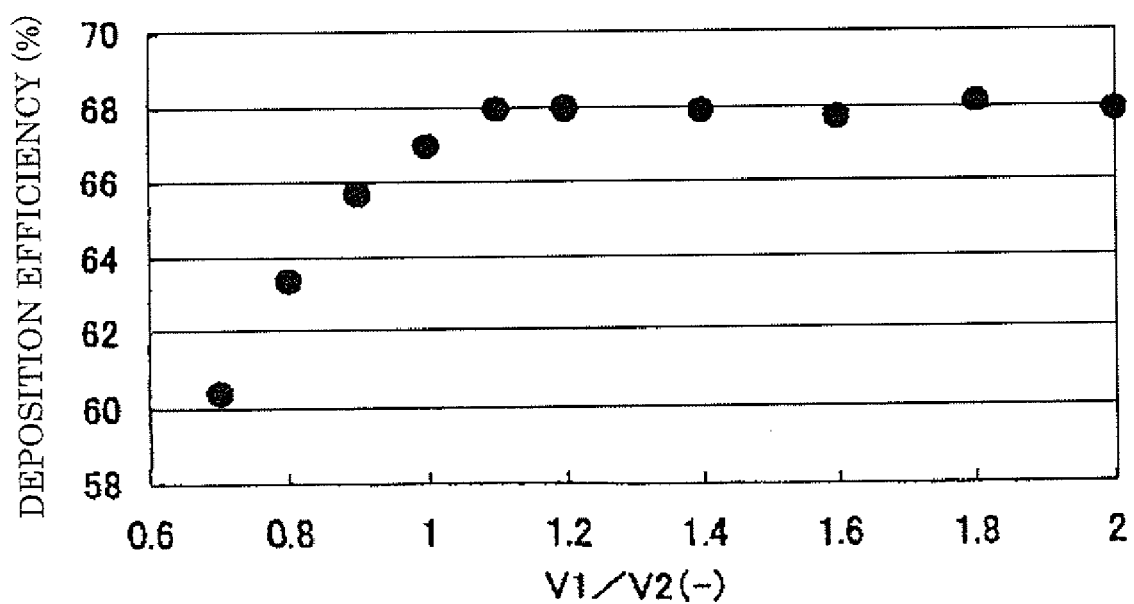
FIG. 3 is a graph illustrating the relation between a gas flow speed ratio $V_1/V_2$ and a deposition efficiency.

FIG. 3 is a graph illustrating the relation between the glass fine particle deposition efficiency and the flow speed ratio $V_1/V_2$, where $V_1$ denotes the gas flow speed at the central gas discharge port 6 (FIRST TUBE) and $V_2$ denotes the gas flow speed at the small-diameter gas discharge ports 9. As seen from the graph, the glass fine particle deposition efficiency increases as the flow speed ratio $V_1/V_2$ increases. After the flow speed ratio $V_1/V_2$ exceeds 1, the deposition efficiency reached substantially the same level as in the first embodiment.

Figure 4:
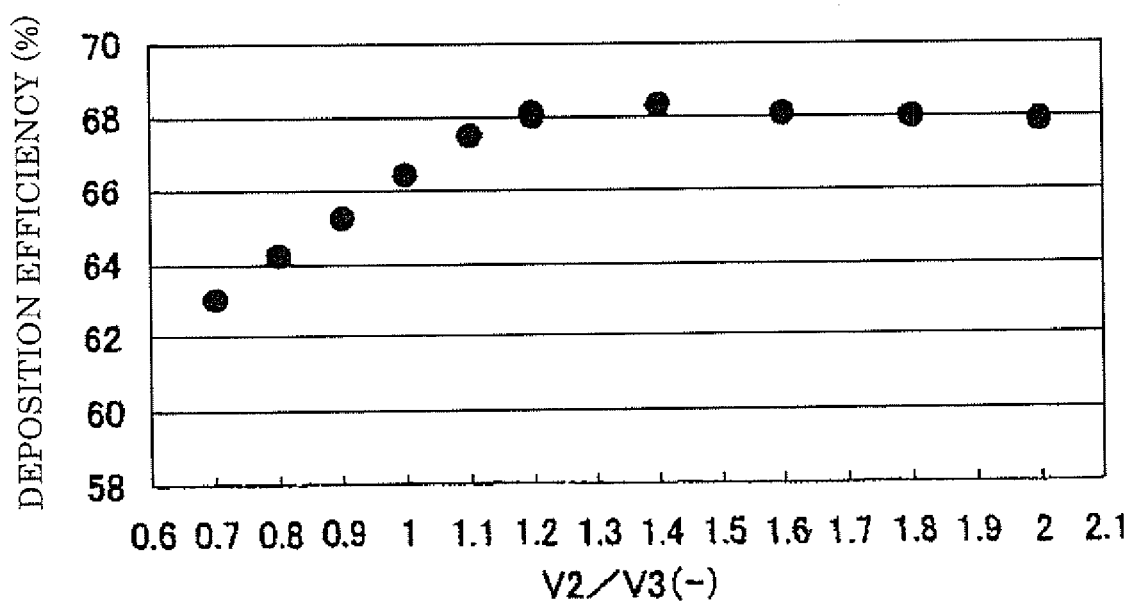
FIG. 4 is a graph illustrating the relation between a gas flow speed ratio $V_2/V_3$ and a deposition efficiency.

FIG. 4 is a graph illustrating the relation between the glass fine particle deposition efficiency and the flow speed ratio $V_2/V_3$, where $V_2$ denotes the gas flow speed at the small-diameter gas discharge ports 9 and $V_3$ denotes the gas flow speed at the combustible gas discharge port 8 (THIRD TUBE). As seen from the graph, the glass fine particle deposition efficiency increases as the flow speed ratio $V_2/V_3$ increases. After the flow speed ratio $V_2/V_3$ exceeds 1.2, the deposition efficiency reached substantially the same level as in the first embodiment.

Figure 5:
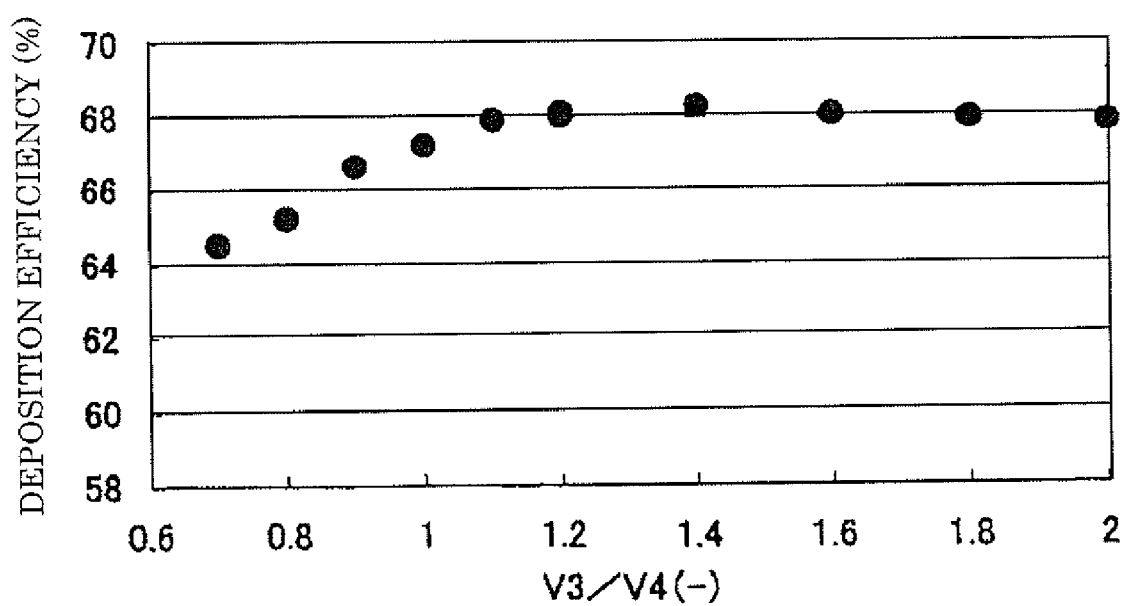
FIG. 5 is a graph illustrating the relation between a gas flow speed ratio $V_3/V_4$ and a deposition efficiency.

FIG. 5 is a graph illustrating the relation between the glass fine particle deposition efficiency and the flow speed ratio $V_3/V_4$, where $V_3$ denotes the gas flow speed at the combustible gas discharge port 8 (THIRD TUBE) and $V_4$ denotes the gas flow speed at the oxidizing gas discharge port 11 (FIFTH TUBE). As seen from the graph, the glass fine particle deposition efficiency increases as the flow speed ratio $V_3/V_4$ increases. After the flow speed ratio $V_3/V_4$ exceeds 1.1, the deposition efficiency reached substantially the same level as in the first embodiment.

As indicated in the above, when the flow speed ratios $V_1/V_2$, $V_2/V_3$, and $V_3/V_4$ are larger than 1, the flow of the flame becomes stable and a high deposition efficiency was achieved.

<Third Embodiment>

The burner 3 having the same configuration as in the first embodiment was used to deposit 50 kg of glass fine particles onto the starting member having the same configuration as in the first embodiment. However, the flow rates of the respective discharge ports were varied in a third embodiment and fifth to eighth comparison examples under the condition that the flow speed $V_1$ at the central gas discharge port 6 ejecting the oxidizing gas remained constant at 29.5 m/s, the flow speed $V_2$ at the small-diameter gas discharge ports 9 remained constant at 25.9 m/s, and the flow speed $V_4$ at the oxidizing gas discharge port 11 remained at 2.1 m/s.

Table 3 shows the flow rates at the respective discharge ports in the third embodiment and the fifth to eighth comparison examples. In Table 3, $O_1$ denotes the gas flow rate of the central gas discharge port 6, $O_2$ denotes the gas flow rate of the small-diameter gas discharge ports 9, and $O_3$ denotes the gas flow rate of the oxidizing gas discharge port 11.

TABLE 3

| | $O_1$ L/min. | $O_2$ L/min. | $O_3$ L/min. | $H_2$ L/min. | DEPOSITION EFFICIENCY % |
|---|---|---|---|---|---|
| Embodiment 3 | 10.0 | 22.0 | 35.0 | 150 | 68.0 |
| Comparison 5 | 12.0 | 26.4 | 42.0 | 150 | 65.7 |
| Comparison 6 | 25.0 | 22.0 | 35.0 | 150 | 62.7 |
| Comparison 7 | 10.0 | 40.0 | 35.0 | 150 | 65.1 |
| Comparison 8 | 10.0 | 22.0 | 15.0 | 150 | 66.5 |

As shown in Table 3, the third embodiment was made under such conditions as to satisfy the relations represented by the following Expressions 2 and 3.

$$H/(O_1+O_2+O_3)>2 \qquad \text{[Expression 2]}$$

$$O_1<O_2<O_3 \qquad \text{[Expression 3]}$$

As seen from Table 3, the third embodiment achieved a deposition efficiency of 68.0%.

In the fifth comparison example, where the flow rates were set at such values not to satisfy the relation represented by Expression 2, the combustible gas was not sufficiently supplied, and the deposition efficiency dropped to 65.7%. In the sixth to eighth comparison examples, where the flow rates were set at such values not to satisfy the relation represented by Expression 3, the deposition efficiency similarly dropped.

As is apparent from the above, the above-described method can boost the blending of the combustible gas and the oxidizing gas even when there is a large distance from the end of the burner to the deposition target surface, thereby increasing the glass fine particle production efficiency. The present invention can also stabilize the flow of the flame and thus achieve a high deposition efficiency for the produced glass fine particles. Therefore, the present invention can improve the deposition speed during the optical fiber base material manufacturing process. Consequently, the present invention can improve the productivity of the optical fiber base material manufacturing method.

Although some aspects of the present invention have been described by way of exemplary embodiments, it should be understood that those skilled in the art might make many changes and substitutions without departing from the spirit and the scope of the present invention which is defined only by the appended claims.

The claims, specification and drawings describe the processes of an apparatus, a system, a program and a method by using the terms such as operations, procedures, steps and stages. When a reference is made to the execution order of the processes, wording such as "before" or "prior to" is not explicitly used. The processes may be performed in any order unless an output of a particular process is used by the following process. In the claims, specification and drawings, a flow of operations may be explained by using the terms such as "first" and "next" for the sake of convenience. This, however, does not necessarily indicate that the operations should be performed in the explained order.

What is claimed is:

1. A method for manufacturing an optical fiber base material comprising:
   producing glass fine particles through a hydrolysis of a glass material gas in a flame created with an oxidizing gas and a combustible gas that are ejected from a burner comprising:
      a central gas discharge tube having a port that ejects a gas containing an oxidizing gas;
      a plurality of first oxidizing gas discharge tubes having a plurality of ports that eject a gas containing an oxidizing gas, the plurality of ports of the plurality of first oxidizing gas discharge tubes being arranged in a concentric circle with the port of the central gas discharge tube so as to externally surround the port of the central gas discharge tube;

a combustible gas discharge tube having a port that ejects a combustible gas, the port of the combustible gas discharge tube being concentrically arranged with the port of the central gas discharge tube so as to externally surround the port of the central gas discharge tube, the combustible gas discharge tube having the plurality of first oxidizing gas discharge tubes arranged therein; and a second oxidizing gas discharge tube having a port that ejects an oxidizing gas, the port of the second oxidizing gas discharge tube being concentrically arranged with the port of the central gas discharge tube so as to externally surround the port of the combustible gas discharge tube, the method further comprising depositing the glass fine particles on a starting member to form the optical fiber base material, wherein the step of producing glass fine particles comprises controlling $O_1$, $O_2$, $O_3$, and H so as to satisfy $H/(O_1+O_2+O_3)>2$ and $O_1<O_2<O_3$ where $O_1$ denotes a gas flow rate at the port of the central gas discharge tube, $O_2$ denotes a gas flow rate at each of the plurality of ports of the plurality of first oxidizing gas discharge tubes, $O_3$ denotes a gas flow rate at the port of the second oxidizing gas discharge tube, and H denotes a gas flow rate at the port of the combustible gas discharge tube.

2. The method as set forth in claim 1, wherein
the gas containing the oxidizing gas that is ejected from the port of the central gas discharge tube contains the glass material gas.

3. The method as set forth in claim 1, wherein
the plurality of ports of the plurality of first oxidizing gas discharge tubes have a same focus distance.

\* \* \* \* \*